United States Patent [19]

Kanno et al.

[11] Patent Number: 5,229,868
[45] Date of Patent: Jul. 20, 1993

[54] METHOD AND APPARATUS FOR CONVERTING A LINE DENSITY OF A BI-LEVEL IMAGE SIGNAL

[75] Inventors: Yoshimitsu Kanno, Sagamihara; Toshiharu Kurosawa, Yokohama; Hidehiko Kawakami, Tokyo; Hiroaki Kotera, Kawasaki; Hiroyoshi Tsuchiya, Abuta; Hideaki Ohira, Ueda; Mutuo Hashizume, Saku, all of Japan

[73] Assignees: Matsushita Electric Industrial Co., Ltd., Osaka; Matsushita Graphic Communication Systems, Inc., Tokyo, both of Japan

[21] Appl. No.: 571,350

[22] Filed: Aug. 23, 1990

[30] Foreign Application Priority Data

Aug. 25, 1989 [JP] Japan .................................. 1-218881
Aug. 25, 1989 [JP] Japan .................................. 1-218882

[51] Int. Cl.$^5$ .................................................. H04N 1/40
[52] U.S. Cl. ...................................... 358/462; 358/447
[58] Field of Search ............... 358/445, 447, 456, 458, 358/459, 462, 463

[56] References Cited

U.S. PATENT DOCUMENTS

| 4,578,812 | 3/1986 | Yui | 382/41 |
|---|---|---|---|
| 4,785,347 | 11/1988 | Ezuka et al. | 358/447 |
| 4,853,794 | 8/1989 | Fukumoto et al. | 358/447 |
| 4,855,841 | 8/1989 | Shimada | 358/447 |
| 4,872,064 | 10/1989 | Tutt et al. | 358/447 |
| 4,899,225 | 2/1990 | Sasuga et al. | 358/462 |
| 4,975,785 | 12/1990 | Kantor | 358/463 |
| 4,996,603 | 2/1991 | Kanemitsu et al. | 358/462 |
| 4,999,629 | 3/1991 | Katsuta | 358/462 |
| 5,008,752 | 4/1991 | Van Nostrand | 358/462 |
| 5,016,118 | 6/1991 | Nannichi | 358/462 |
| 5,025,325 | 6/1991 | Hudson | 358/447 |

FOREIGN PATENT DOCUMENTS 0041400 12/1981 European Pat. Off. .
0342845 11/1989 European Pat. Off. .
59-158666 9/1984 Japan .

Primary Examiner—Edward L. Coles, Sr.
Assistant Examiner—Thomas L. Stoll
Attorney, Agent, or Firm—Lowe, Price, LeBlanc & Becker

[57] ABSTRACT

A correspondence relation between a structure of a bi-level pattern A and a structure of a bi-level pattern B is statistically learned by use of a learning high-density image. The bi-level pattern A forms a partial region of a low-density character and line image except a screened dot image. The bi-level pattern B forms a corresponding partial region of a desired high-density image. A judgement is made as to whether the low-density image is equal to or different from a screened dot image. Reference pixels are selected from the partial region of the low-density image. The low-density bi-level pattern A is converted into the high-density bi-level pattern B on the basis of a result of the learning by use of the selected reference pixels when the low-density image is different from a screened dot image. A pixel of the low-density image is repeated to convert the low-density image into the high-density image when the low-density image is equal to a screend dot image.

17 Claims, 13 Drawing Sheets

| ADDRESS (REFERENCE DATA) | | | | | | DATA (INTERPOLATION VALUES) | | | |
|---|---|---|---|---|---|---|---|---|---|
| $r_1$ | $r_2$ | $r_3$ | --------- | $r_{15}$ | $r_{16}$ | $h_1'$ | $h_2'$ | $h_3'$ | ---- |
| 0 | 0 | 0 | --------- | 0 | 0 | 1/0 | 1/0 | 1/0 | ---- |
| 0 | 0 | 0 | --------- | 0 | 1 | 1/0 | 1/0 | 1/0 | ---- |
| 0 | 0 | 0 | --------- | 1 | 0 | 1/0 | 1/0 | 1/0 | ---- |
| | | | | | | | | | |
| 1 | 1 | 1 | --------- | 1 | 1 | 1/0 | 1/0 | 1/0 | ---- |

METHOD AND APPARATUS FOR CONVERTING A LINE DENSITY OF A BI-LEVEL IMAGE SIGNAL

BACKGROUND OF THE INVENTION

This invention relates to a method and an apparatus for converting a line density of a bi-level or binary image signal.

According to the G3 standards of facsimile communication, the resolution in the main scanning direction is fixed to 8.037 pixel/mm while the resolution in the sub scanning direction can be changed among 3.85 pixel/mm, 7.7 pixel/mm, and 15.4 pixel/mm in dependence upon the contents of a transmitted image.

Some high-resolution printers such as laser printers can print out information at a density equal to or above 16 pixel/mm. In cases where such high-resolution printers are used in combination with a G3 facsimile system, it is necessary to provide a device for converting a low-density image signal into a high-density image signal. Such a line-density converting device is necessary also in other systems, for example, an image data file system.

Various methods of converting the line density of a bi-level image signal have been proposed. Improvements are desired in these prior art methods.

SUMMARY OF THE INVENTION

It is an object of this invention to provide an improved method of converting a line density of a bi-level image signal.

It is another object of this invention to provide an improved apparatus for converting a line density of a bi-level image signal.

According to a first aspect of this invention, a method of converting a low-density bi-level image into a high-density bi-level image through a pixel interpolation process comprises the steps of statistically learning a correspondence relation between a structure of a bi-level pattern A and a structure of a bi-level pattern B by use of a learning high-density image, the bi-level pattern A forming a partial region of a low-density character and line image except a screened dot image, the bi-level pattern B forming a corresponding partial region of a desired high-density image; judging whether the low-density image is equal to or different from a screened dot image; selecting reference pixels from the partial region of the low-density image; converting the low-density bi-level pattern A into the high-density bi-level pattern B on the basis of a result of said learning step by use of the selected reference pixels when the low-density image is different from a screened dot image; and repeating a pixel of the low-density image to convert the low-density image into the high-density image when the low-density image is equal to a screened dot image.

According to a second aspect of this invention, a method of converting a low-density bi-level image into a high-density bi-level image through a pixel interpolation process comprises the steps of statistically learning a correspondence relation between a structure of a bi-level pattern A1 and a structure of a bi-level pattern B1 by use of a learning high-density image, the bi-level pattern A1 forming a partial region of a low-density character and line image except a screened dot image, the bi-level pattern B1 forming a corresponding partial region of a desired high-density image; statistically learning a correspondence relation between a structure of a bi-level pattern A2 and a structure of a bi-level pattern B2 by use of a learning high-density image, the bi-level pattern A2 forming a partial region of a low-density screened dot image, the bi-level pattern B2 forming a corresponding partial region of a desired high-density image; judging whether the low-density image is equal to or different from a screened dot image; selecting reference pixels from the partial region of the low-density image; converting the low-density bi-level pattern A1 into the high-density bi-level pattern B1 on the basis of a result of said learning steps by use of the selected reference pixels when the low-density image is different from a screened dot image; and converting the low-density bi-level pattern A2 into the high-density bi-level pattern B2 on the basis of a result of said learning steps by use of the selected reference pixels when the low-density image is equal to a screened dot image.

According to a third aspect of this invention, a method of converting a low-density bi-level image into a high-density bi-level image through a pixel interpolation process comprises the steps of statistically learning a correspondence relation between a structure of a bi-level pattern A and a structure of a bi-level pattern B by use of a learning high-density image, the bi-level pattern A forming a partial region of a low-density character and line image except a screened dot image, the bi-level pattern B forming a corresponding partial region of a desired high-density image; making an interpolation dictionary through said learning step, the interpolation dictionary indicating said correspondence relation; making a correspondence relation in a non-learning portion of the interpolation dictionary from given pixels of the bi-level pattern A in accordance with a given rule, wherein the correspondence relation in the non-learning portion of the interpolation dictionary can not be learned by said learning step; selecting reference pixels from the partial region of the low-density image; and converting the low-density bi-level pattern A into the high-density bi-level pattern B on the basis of the interpolation dictionary by use of the selected reference pixels.

According to a fourth aspect of this invention, an apparatus comprises means for processing an input image signal through an interpolation having a variable characteristic; means for detecting whether or not the input image signal represents a screened dot image; and means for varying the characteristic of the interpolation in accordance with a result of said detecting.

According to a fifth aspect of this invention, an apparatus comprises means for storing interpolation data which are predetermined in correspondence with images except for screened dot images; means for detecting whether or not an input image signal represents a screened dot image; means for, when said detecting means detects that the input image signal does not represent a screened dot image, reading out a portion of the interpolation data which corresponds to an image represented by the input image signal; means for, when said detecting means detects that the input image signal does not represent a screened dot image, processing the input image signal through an interpolation by use of said readout portion of the interpolation data; and means for, when said detecting means detects that the input image signal represents a screened dot image, processing the input image signal through an interpolation by use of a part of the input image signal.

DESCRIPTION OF THE FIRST PREFERRED EMBODIMENT

Figure 1:
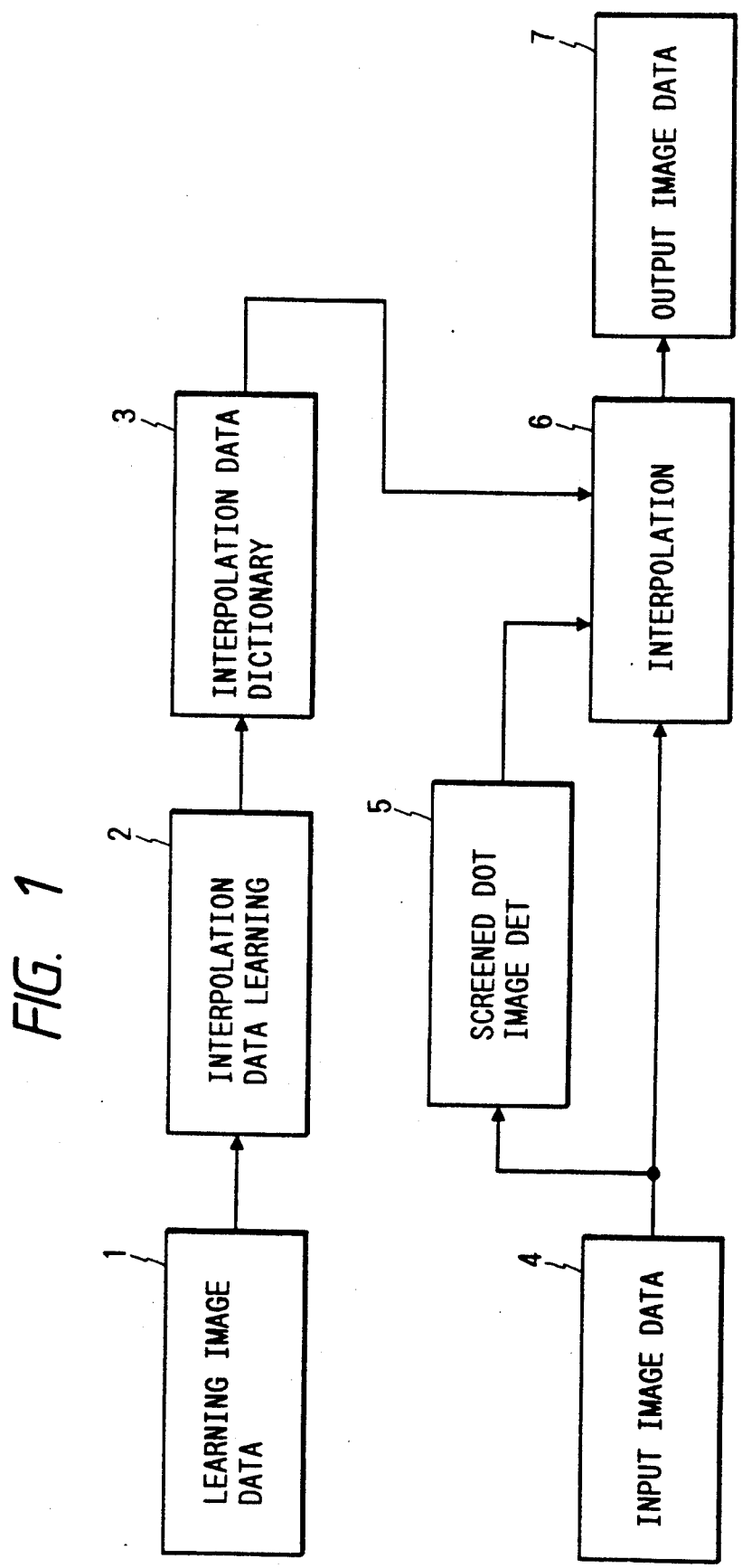
FIG. 1 is a diagram showing a flow of processes in a method of converting a line density of a bi-level image signal according to a first embodiment of this invention.

With reference to FIG. 1, predetermined image data 1 used for a learning process include data representing the contents of various input images such as character and line images. The learning image data 1 are represented at a predetermined resolution which agrees with a scanning line density of the recording of a resultant of an interpolation of input image data. The scanning line density of the learning image data 1 in a main scanning direction is denoted as "m" [pixel/mm]. The scanning line density of the learning image data 1 in a sub scanning direction is denoted as "n" [pixel/mm].

A block 2 represents a process of learning interpolation image data by referring to the learning image data 1. As will be described in detail later, the learning process 2 depends on the type of the magnification of an interpolation with respect to input image data. The learning process 2 enables an interpolation for multiplying the input image data by a predetermined value "K" in the main scanning direction and multiplying the input data by a predetermined value "L" in the sub scanning direction. This learning process is referred to as a K×L interpolation learning process.

A block 3 represents a process of making a dictionary of interpolation data on the basis of a result of the interpolation learning process 2. The interpolation data in this dictionary contain "K×L" interpolation data for character and line images which are used in determining whether interpolation values are "1" or "0".

Input image data 4 are represented at a predetermined resolution. Specifically, the scanning line density of the input image data 4 in the main scanning direction is equal to a predetermined value "m/K" [pixel/mm]. The scanning line density of the input image data 4 in the sub scanning direction is equal to a predetermined value "n/L" [pixel/mm].

A block 5 denotes a process of detecting whether or not the input image data 4 represent a screened dot image.

A block 6 denotes an interpolation process by which the input image data 4 are changed into interpolated image data or output image data 7 in such a manner that the input image data 4 are multiplied by the value "K" in the main scanning direction and are multiplied by the value "L" in the sub scanning direction. Thus, the scanning line density of the interpolated image data (the output image data) 7 in the main scanning direction is equal to the value "m" [pixel/mm]. The scanning line density of the interpolated image data (the output image data) 7 in the sub scanning direction is equal to the value "n" [pixel/mm]. The interpolation process 5 is made by referring to the interpolation data dictionary fed from the block 3, or by referring to a portion of the input image data 4. The interpolation process 6 is changed in response to a result of the screened dot image detecting process 5. Specifically, when the block 5 detects that the input image data 4 represent a screened dot image, the interpolation process 6 uses data of a given pixel of the input image data 4 in multiplying the input image data 4. When the block 5 detects that the input image data 4 do not represent a screened dot image, the interpolation process 6 uses the interpolation data dictionary in multiplying the input image data 4.

Figures 2, 3:
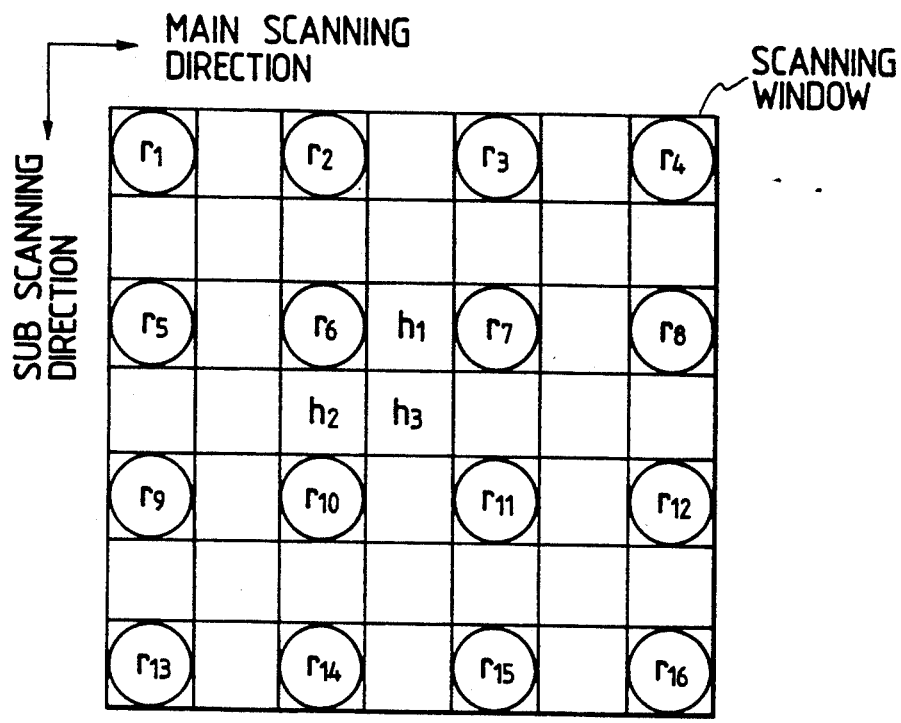
FIG. 2 is a diagram of a scanning window used in the method of FIG. 1.
FIG. 3 is a diagram of an interpolation dictionary used in the method of FIG. 1.

The learning process 2 will be described in detail hereinafter in the case where both the values "K" and "L" are equal to 2. FIG. 2 shows a scanning window for a 2×2 interpolation learning process. The scanning window has 7×7 pixels composed of reference pixels r1-r16, learning pixels h1-h3, and non-reference and non-learning pixels. The reference pixels r1-r16 are in a 4×4 configuration and are separated vertically and horizontally at intervals of one pixel. The learning pixels h1-h3 are close to the reference pixel r6 and extend in a central region of the scanning window. Since the number of the reference pixels r1-r16 is 16, the number of different patterns which can be formed by the reference pixels r1-r16 is equal to $2^{16}$. The learning process 2 is realized by scanning the learning image data 1 with the scanning window and by statistically examining whether each of the data values of the learning pixels h1-h3 is "1" or "0". In the case where the learning process 2 is executed by use of a computer, a program operating the computer is designed so as to perform the following processes. The reference pixels r1-r16 are used as addresses in a memory space, and three up-down counters corresponding to the respective learning pixels h1-h3 are prepared for each of these addresses. the counter value is incremented and decremented by "1" when the data value of the corresponding learning pixel is "1" and "0" respectively.

The dictionary making process 3 will be described in detail hereinafter. In the case where the dictionary making process 3 is executed by use of a computer, a program operating the computer is designed so as to perform the following processes. The reference pixels r1–r16 are used as data addresses in a memory (a ROM or a RAM within the computer) space, and a bit pattern is formed by the values, that is, "1" and "0", of respective interpolation data h'1, h'2, . . . . The values of the interpolation data h'1, h'2, . . . are set in dependence on the counter values hi (i=1, 2, . . . ) obtained in the learning process 2. Specifically, when all the counter values hi are greater than "0", the interpolation data are set as h'i=1. When the counter values hi are equal to or smaller than "0" and at least one of the counter values hi differs from "0", the interpolation data are set as h'i=0. The case where all the counter values hi are equal to "0" is regarded as a non-learned pattern, and the interpolation data are set as h'i=r6 in this case. As shown in FIG. 2, the reference pixel r6 is close to the interpolation pixels h1–h3. The interpolation data dictionary holds correspondence relations between input character and line images and interpolation data, the correspondence relations being determined by the learning process 2.

Figure 4:
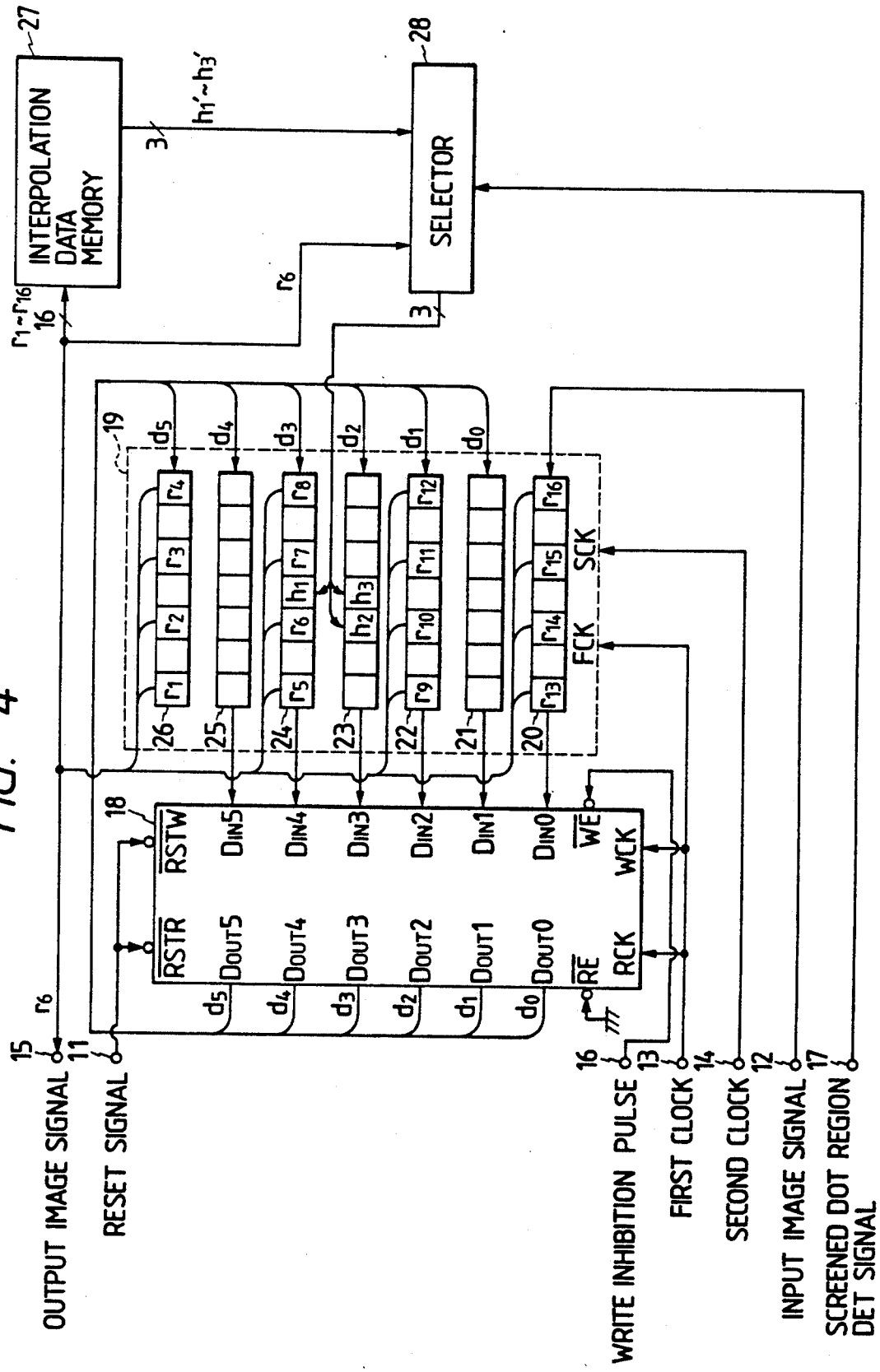
FIG. 4 is a block diagram of a circuit for executing the interpolation process in the method of FIG. 1.
Figure 5:
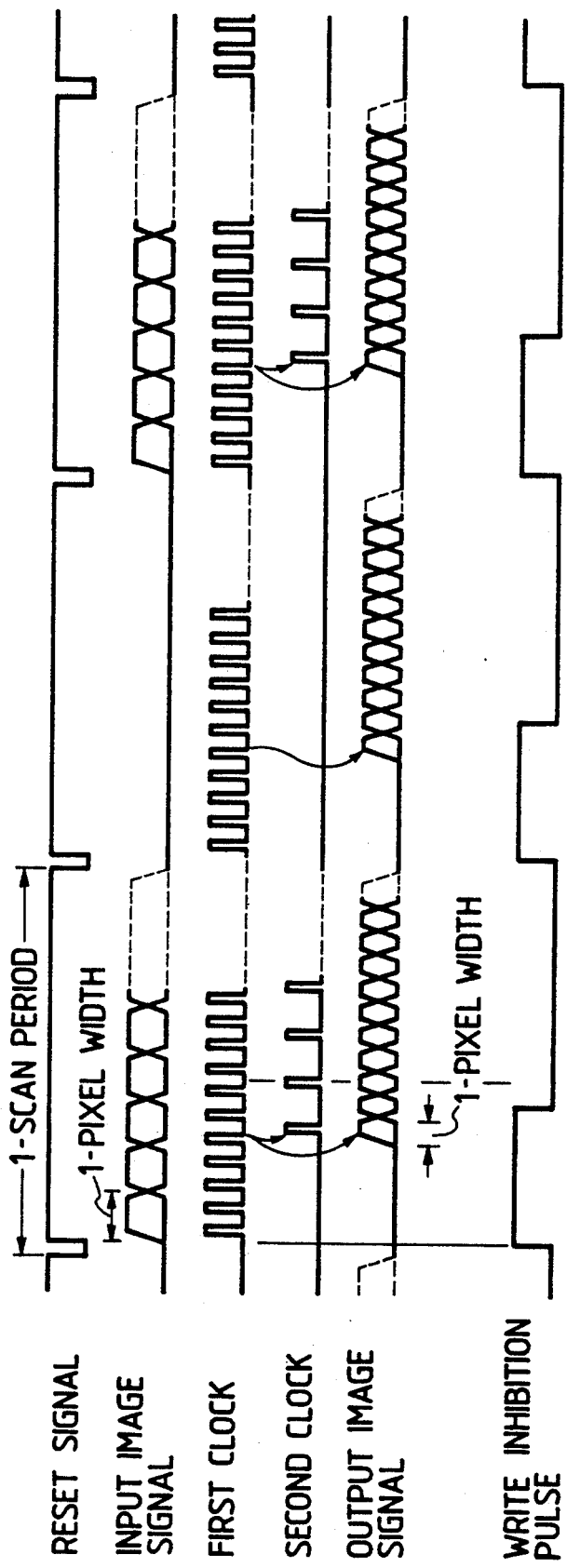
FIG. 5 is a timing diagram showing the waveforms of various signals in the interpolation circuit of FIG. 4.

FIG. 4 shows a circuit for executing the interpolation process 6. FIG. 5 shows the waveforms of various signals in the circuit of FIG. 4. A reset signal is applied to an input terminal 11. As shown in FIG. 5, the reset signal contains a pulse which occurs for each one scanning period (a main scanning period) of an output high-density image signal. The reset signal is generated by a suitable device (not shown). An input low-density bi-level image signal representing the input image data 4 is applied to an input terminal 12. As shown in FIG. 5, a 1-scanning-line portion of the input image signal is fed for each of alternate one scanning periods. This feed of the input image signal is realized by a known circuit (not shown). A first clock signal is applied to an input terminal 13. The first clock signal corresponds to a pixel clock signal of the output high-density image signal. It should be noted that the frequency of the pixel clock signal of the output high-density image signal equals twice the frequency of a pixel clock signal of the input low-density image signal. The first clock signal is generated by a suitable device (not shown). A second clock signal is applied to an input terminal 14. The second clock signal is a timing pulse used in inserting interpolation data into the input image data 4. As shown in FIG. 5, the frequency of the second clock signal is half the frequency of the first clock signal. The second clock signal contains a train of pulses which occur for each of alternate one scanning periods. The second clock signal is generated by a suitable device (not shown). An output high-density image signal is applied to an output terminal 15. As shown in FIG. 5, a 1-scanning-line portion of the output image signal is fed for each one scanning period. Write inhibition pulses are applied to an input terminal 16. As shown in FIG. 5, each of the write inhibition pulses occurs for each one scanning period. The write inhibition pulses are used in controlling a write address pointer of an image memory 18. The write inhibition pulses are generated by a suitable device (not shown). A screen dot region detection signal is applied to an input terminal 17. The screen dot region detection signal is generated from the screened dot image detecting process 5.

An image memory 18 includes a line memory having an 8-bit FIFO (first-in first-out) structure. The image memory 18 can be one of commercially-available IC memories such as "µPD41101C" produced by NEC. The image memory 18 has data input terminals DIN0–DIN5, data output terminals DOUT0–DOUT5, reset input terminals $\overline{\text{RSTR}}$ and $\overline{\text{RSTW}}$, clock input terminals RCK and WCK, a read control input terminal $\overline{\text{RE}}$, and a write control input terminal $\overline{\text{WE}}$. The reset signal is fed to the reset input terminals $\overline{\text{RSTR}}$ and $\overline{\text{RSTW}}$ via the input terminal 11. A read address pointer provided in the image memory 18 is initialized and specifically a data address is set to "0" by a pulse of the reset signal applied to the reset input terminal $\overline{\text{RSTR}}$. A write address pointer provided in the image memory 18 is initialized and specifically a data address is set to "0" by a pulse of the reset signal applied to the reset input terminal $\overline{\text{RSTW}}$. The first clock signal is fed to the clock input terminals RCK and WCK via the input terminal 13. The read address pointer is incremented by "1" in response to a pulse of the first clock signal applied to the clock input terminal RCK. The write address pointer is incremented by "1" in response to a pulse of the first clock signal applied to the clock input terminal WCK. When the read control input terminal $\overline{\text{RE}}$ is subjected to an "H" level, the read address pointer remains unchanged independent of pulses of the first clock signal applied to the clock input terminal RCK. In this embodiment, the read control input terminal $\overline{\text{RE}}$ is grounded and is thus subjected to an "L" level so that the previously-mentioned control of fixing the read address pointer remains disabled. The write inhibition pulses are applied to the write control input terminal $\overline{\text{WE}}$ via the input terminal 16. During the presence of each write inhibition pulse applied to the write control input terminal $\overline{\text{WE}}$, the write address pointer remains unchanged independent of pulses of the first clock signal applied to the clock input terminal WCK. During the absence of each write inhibition pulse applied to the write control input terminal $\overline{\text{WE}}$, the previously-mentioned control of fixing the write address pointer remains removed.

A group 19 has seven 7-bit shift registers 20–26. The register group 19 has an arrangement of 7×7 1-bit storage segments which corresponds to the arrangement of the 7×7 pixels of the scanning window of FIG. 2. The characters r1–r16 and h1–h3 of FIG. 4 denote 1-bit storage segments corresponding to the reference pixels r1–r16 and the interpolation pixels h1–h3 of FIG. 2 respectively. The register group 19 has a shift clock input terminal FCK and a clock input terminal SCK. The shift registers 20–26 are connected in common to the shift clock input terminal FCK. The first clock signal is fed to the shift clock input terminal FCK via the input terminal 13. Data in the shift registers 20–26 are shifted in response to a pulse of the first clock signal applied to the shift clock input terminal FCK. The second clock signal is fed to the clock input terminal SCK via the input terminal 14. The 1-bit storage segments h1–h3 are loaded with interpolation data in response to a pulse of the second clock signal applied to the clock input terminal SCK. The end 1-bit segments of the shift registers 20–25 are connected to the data input terminals DIN0–DIN5 of the image memory 18 respectively. The start 1-bit segments of the shift registers 21–26 are connected to the data output terminals DOUT0–DOUT5 of the image memory 18 respectively. The start 1-bit segment of the shift register 20 receives the input image signal via the input terminal 12. The 1-bit segment r6 in the shift register 24 is connected to the output terminal 15 so that an output high-density image signal is transmitted from the 1-bit segment r6 to the output terminal 15.

A memory 27 is previously loaded with interpolation data h′1–h′3 which are generated by the interpolation data making process 3. The 1-bit storage segments r1–r16 of the register group 19 are connected to address lines of the interpolation data memory 27 so that the data outputted from the 1-bit storage segments r1–r16 form an address signal for the access to the storage locations of the interpolation data memory 27. An example of the contents of the interpolation data stored in the memory 27 is shown in FIG. 3. The interpolation data h′1–h′3 outputted from the memory 27 are determined in dependence on the data in the 1-bit segments r1–r16 of the register group 19.

A data selector 28 receives the interpolation data h′1–h′3 outputted from the memory 27. In addition, the data selector 28 receives the data transmitted from the 1-bit storage segment r6 of the register group 19. The data selector 28 has three output terminals which are connected to the 1-bit storage segments h1–h3 of the register group 19 respectively. The data selector 28 has a control terminal receiving the screen dot region detection signal via the input terminal 17. When the screen dot region detection signal is in an ON state (=1), that is, when the input image signal represents a screened dot image, the data selector 28 loads the 1-bit storage segments h1–h3 of the register group 19 with interpolation data equal to the data in the 1-bit storage segment r6 of the register group 19. When the screen dot region detection signal is in an OFF state (=0), that is, when the input image signal does not represent a screened dot image, the data selector 28 loads the 1-bit storage segments h1–h3 of the register group 19 with the interpolation data h′1–h′3 respectively.

The overall operation of the interpolation circuit of FIG. 4 will be briefly described hereinafter. At a start of each one scanning period, the read address pointer and the write address pointer of the image memory 18 are initialized to "0" by a pulse of the reset signal fed via the input terminal 11. Then, the read address pointer is incremented by each of pulses of the first clock signal fed via the input terminal 13. The write inhibition pulse fed via the input terminal 16 prevents the write address pointer from being incremented for a given interval corresponding to a pulse count number of 7. Thus, the start of the increment of the write address pointer is delayed from the start of the increment of the read address pointer by a counter number of 7. This delay time corresponds to a time which is spent in the shift of data from the start 1-bit segment to the end 1-bit segment of each of the shift registers 20–26. After the given delay interval elapses, the write address pointer starts to be incremented by each of pulses of the first clock signal fed via the input terminal 13.

During a first one scanning interval, the input image signal fed via the input terminal 12 is passed through the shift register 20 of the register group 19 and is stored into the image memory 18 via the data input terminal DIN0 in response to pulses of the first clock signal fed via the input terminal 13. During a second one scanning interval, the input image signal is outputted from the image memory 18 via the data output terminal DOUT0 and is passed through the shift register 21 of the register group 19, and then the input image signal is stored into the image memory 18 via the data input terminal DIN1. During subsequent one scanning intervals, the input image signal flows as "DOUT1→register 22→DIN2→DOUT2→register 23→DIN3→. . . ". During these processes, the input image signal is subjected to a data interpolation. Specifically, the interpolation data fed via the data selector 28 are inserted into the input image signal at the 1-bit segments h2 and h3 of the shift register 23 and the 1-bit segment h1 of the shift register 24 in response to pulses of the second clock signal fed via the input terminal 14.

Figure 6:
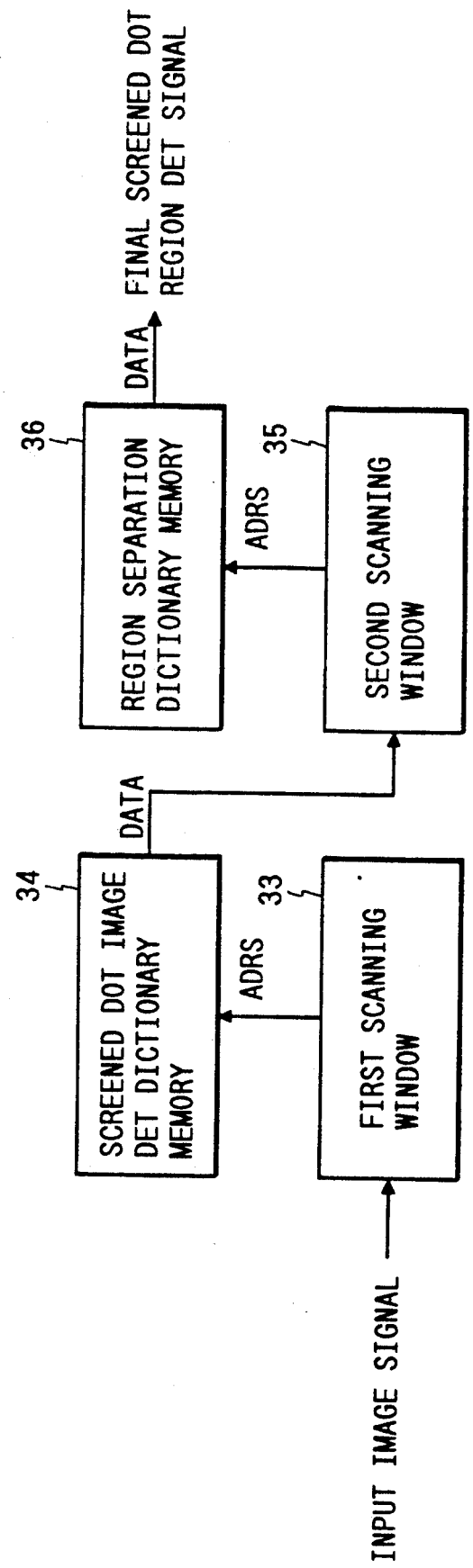
FIG. 6 is a block diagram of a first example of a circuit for executing the screened dot image detecting process in the method of FIG. 1.
Figure 7:
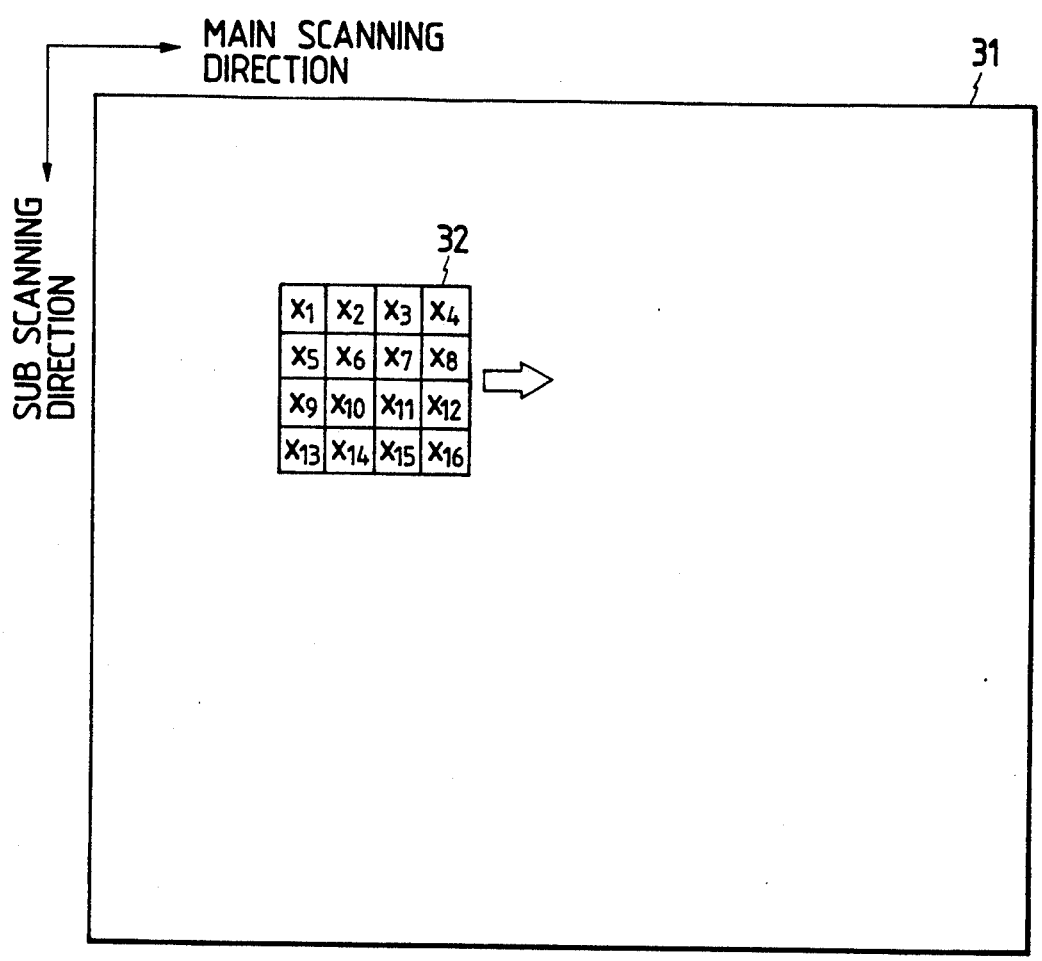
FIG. 7 is a diagram showing an image data region and a scanning window used in the circuit of FIG. 6.

The screened dot image detecting process 5 will be described in detail hereinafter. FIG. 6 shows a first example of a circuit for executing the screened dot image detecting process 5. The circuit of FIG. 6 includes a section 33 for determining a scanning window 32 in an image data region 31 by selecting a given number of adjacent pixels from the image data region 31 as shown in FIG. 7. The scanning window 32 has 4×4 pixels. The image data region 31 is scanned with the scanning window 32. A memory 34 stores a dictionary for the detection of a screened dot image. This dictionary is made on the basis of learning screened dot images having the same line density as the line density of the input image data 4. The dictionary memory 34 is prepared as follows. Firstly, all storage locations of an original memory 34 are initialized to "0" states. Then, bi-level data values {x1, x2, . . . , x16} of the pixels within the scanning window 32 are used as addresses, and the storage locations of the memory 34 which correspond to these addresses are set to "1" states.

During a detection of a screened dot image represented by the input image data 4, the data values of the pixels within the scanning window 32 are used as an address, and the data value of a storage location of the dictionary memory 34 which is designated by this address is referred to. When the referred data value is "1", a screened dot image region is judged to be present. When the referred data value is "0", a screened dot image region is judged to be absent.

The results of the judgement of the screened dot image detection are discrete outputs such that a large number of "1" are present in a screened dot image region while only a small number of "1" are present in character and line image regions. Accordingly, the results of the judgement are subjected to a two-dimensionally smoothing process by use of subsequent sections 35 and 36 to obtain final judgment results.

The section 35 determines a second scanning window with respect to a screen dot region detection signal outputted from the dictionary memory 34. The section 36 includes a memory 34 which stores a region separation dictionary. The region separation dictionary memory 36 outputs a final screen dot region detection signal in response to an address formed by the data of pixels within the second scanning window given by the section 35. The region separation dictionary memory 36 is prepared as follows. Firstly, the number of "1" in the address data values is examined. When the examined number of "1" is equal to or greater than a preset number, the data values of these addresses of an original memory 36 are set to "1" and the other data values are set to "0".

Figure 8:
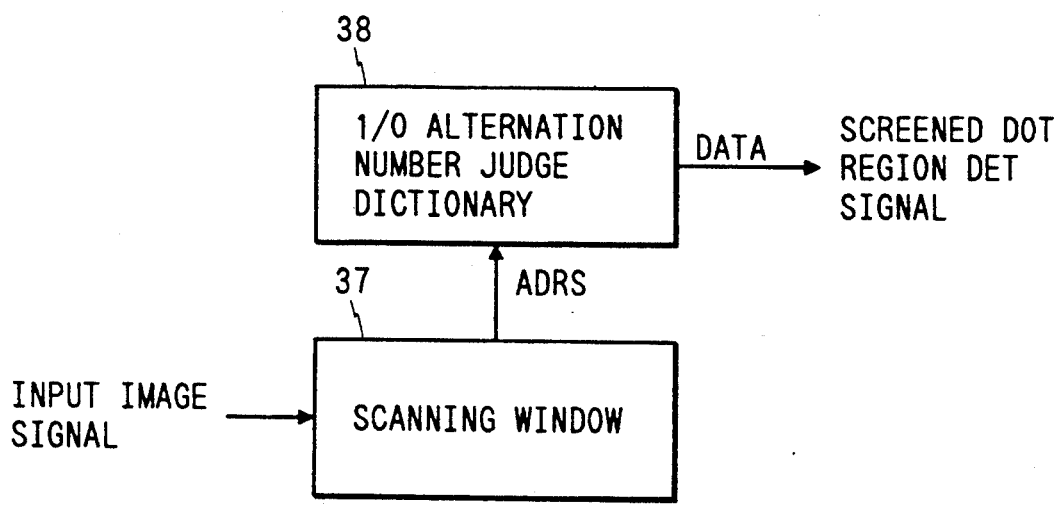
FIG. 8 is a block diagram of a second example of a circuit for executing the screened dot image detecting process in the method of FIG. 1.

Other examples of a circuit for executing the screened dot image detecting process 5 will be described hereinafter. The screened dot image detecting process 5 executed by the other circuits is of a type which examines the structure of a pattern of the data values of input image data pixels in a predetermined scanning window. FIG. 8 shows a second example of a circuit for executing the screened dot image detecting process 5. The circuit of FIG. 8 includes a section 37 for determining a scanning window in the input image data 4 by selecting a given number of adjacent pixels of the input image data 4. The section 37 is realized by a combination of a memory and an address generator. The window pixel data values outputted from the section 37 form an address signal fed to a memory 38 which is previously loaded with a judgment dictionary containing predetermined data. The judgment dictionary is designed so as to detect pairs of "1" and "0" in adjacent pixels of the scanning window along the main and sub scanning directions, that is, "1/0" and "0/1" alternations in the scanning window along the main and sub scanning directions. A screen dot region detection signal is outputted from the memory 38 in response to the address signal fed from the section 37. The screen dot region detection signal depends on whether or not the number of pairs of "1" and "0" in adjacent pixels of the scanning window along the main and sub scanning directions is greater than a preset reference number. Specifically, when the number of pairs of "1" and "0" is greater than the reference number, the screen dot region detection signal is in the ON state. When the number of pairs of "1" and "0" is equal to or smaller than the reference number, the screen dot region detection signal is in the OFF state.

Figure 9:
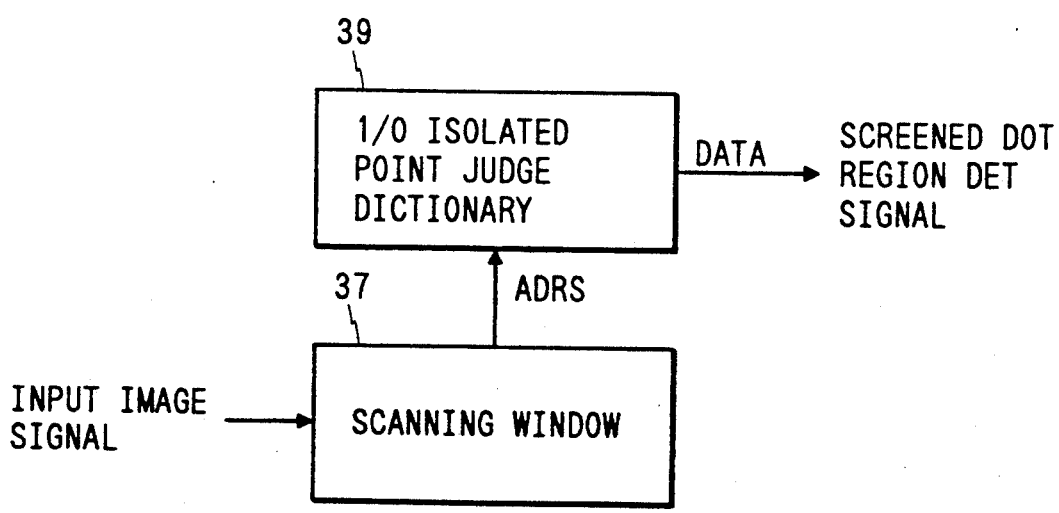
FIG. 9 is a block diagram of a third example of a circuit for executing the screened dot image detecting process in the method of FIG. 1.

FIG. 9 shows a third example of a circuit for executing the screened dot image detecting process 5. The circuit of FIG. 9 is similar to the circuit of FIG. 8 except for the following design change. The circuit of FIG. 9 includes a memory 39 which is previously loaded with a judgement dictionary containing predetermined data. The judgment dictionary is designed so as to detect isolated points of "1" or "0" in pixel data in a scanning window. The memory 39 receives an address signal from a section 37. A screen dot region detection signal is outputted from the memory 39 in response to the address signal fed from the section 37. The screen dot region detection signal depends on whether an isolated point of "1" or "0" is present in or absent from the pixel data in the scanning window. Specifically, when an isolated point of "1" or "0" is present in the pixel data in the scanning window, the screen dot region detection signal is in the ON state. When an isolated point of "1" or "0" is absent from the pixel data in the scanning window, the screen dot region detection signal is in the OFF state.

A fourth example of a circuit for executing the screened dot image detecting process 5 is similar to the circuit of FIG. 8 except for the following design change. The fourth example uses a combination of the judgment dictionaries of the circuits of FIGS. 8 and 9 in detecting a screened dot image.

A fifth example of a circuit for executing the screened dot image detecting process 5 is similar to the circuit of FIG. 8 or FIG. 9 except that a result of the judgment of a screened dot image is subjected to a two-dimensionally smoothing process to obtain a final screen dot region detection signal. The smoothing process may be similar to the smoothing process of FIG. 6.

Figure 10:
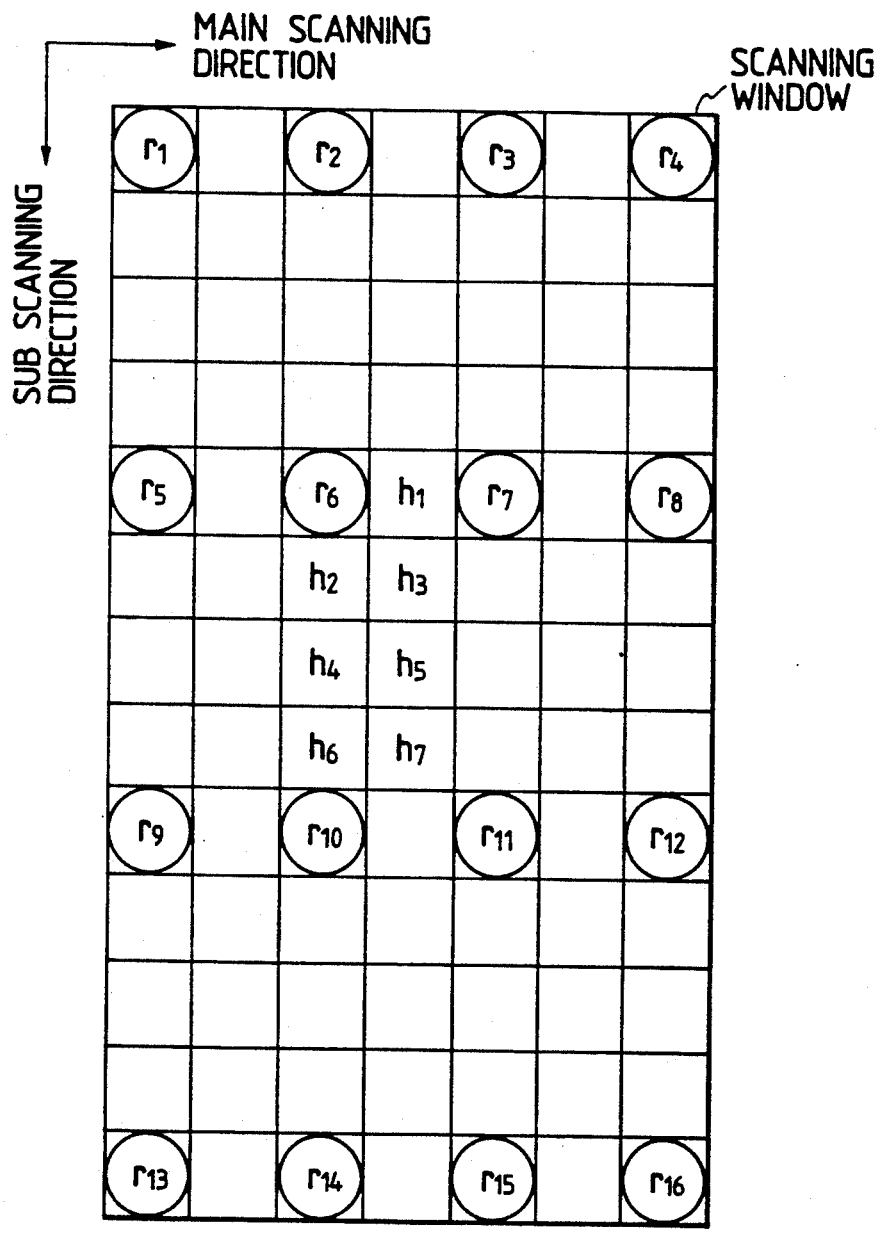
FIG. 10 is a diagram of another scanning window which can be used in the method of FIG. 1.

While the 2×2 interpolation is performed in this embodiment, a 2×4 interpolation may be used. In this case, a scanning window for an interpolation learning process has an arrangement shown in FIG. 10. In the scanning window of FIG. 10, reference pixels r1–r16 are separated at intervals of three pixels in a sub scanning direction, and seven learning pixels h1–h7 are provided in a region close to the reference pixel r6. In a circuit for executing the 2×4 interpolation, a register group 19 has a design corresponding to the arrangement of the scanning window of FIG. 10, and an image memory 18 has a capacity corresponding to 12 lines. In addition, an input image signal and a second clock signal are inputted for every fourth scanning interval.

DESCRIPTION OF THE SECOND PREFERRED EMBODIMENT

A second embodiment of this invention is similar to the embodiment of FIGS. 1-10 except for additional designs which will be explained hereinafter.

Figure 11:
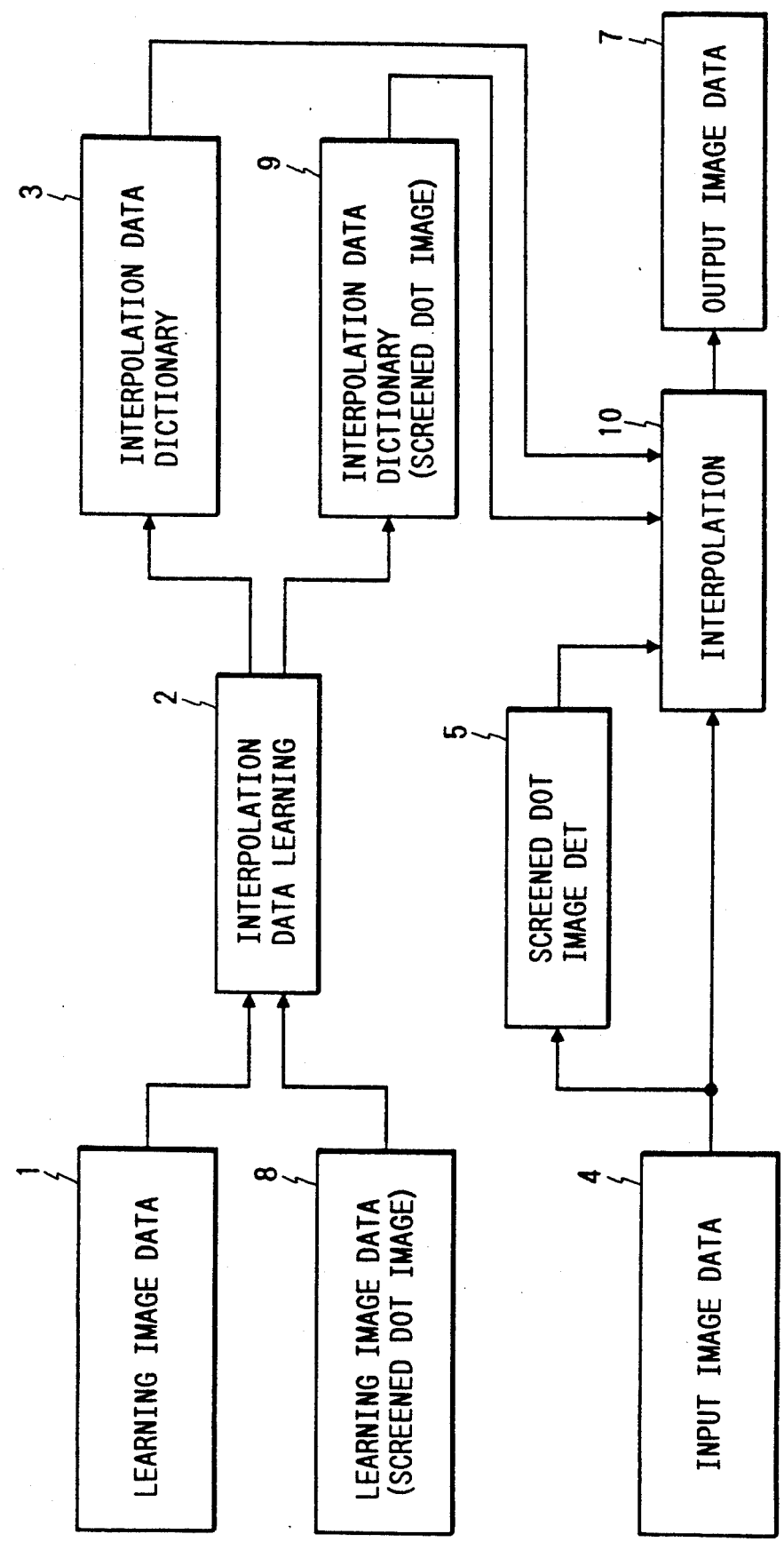
FIG. 11 is a diagram showing a flow of processes in a method of converting a line density of a bi-level image signal according to a second embodiment of this invention.

With reference to FIG. 11, predetermined image data 8 used for a learning process represent screened dot images and have the same format as the format of image data 1 for the learning process. The learning image data 8 are used in a learning process 2. A block 9 represents a process of making a dictionary of screened dot image K×L interpolation data on the basis of a result of the interpolation learning process 2. The dictionary made by the process 9 has the same format as the format of a dictionary made by a process 3. An interpolation process 10 replacing the interpolation process 6 of FIG. 1 changes input image data 4 into interpolated data 7 in such a manner that the input image data 4 are multiplied by the value "K" in the main scanning direction and are multiplied by the value "L" in the sub scanning direction. The interpolation process 10 is changed in response to a signal generated by a screened dot image detection process 5. Specifically, when the screened dot image detecting process 5 detects that the input image data 4 represent a screened dot image, the interpolation process 10 uses the screened dot image data dictionary made by the process 9. When the screened dot image detecting process 5 detects that the input image data 4 do not represent a screened dot image, the interpolation process 10 uses the dictionary made by the process 3.

Figure 12:
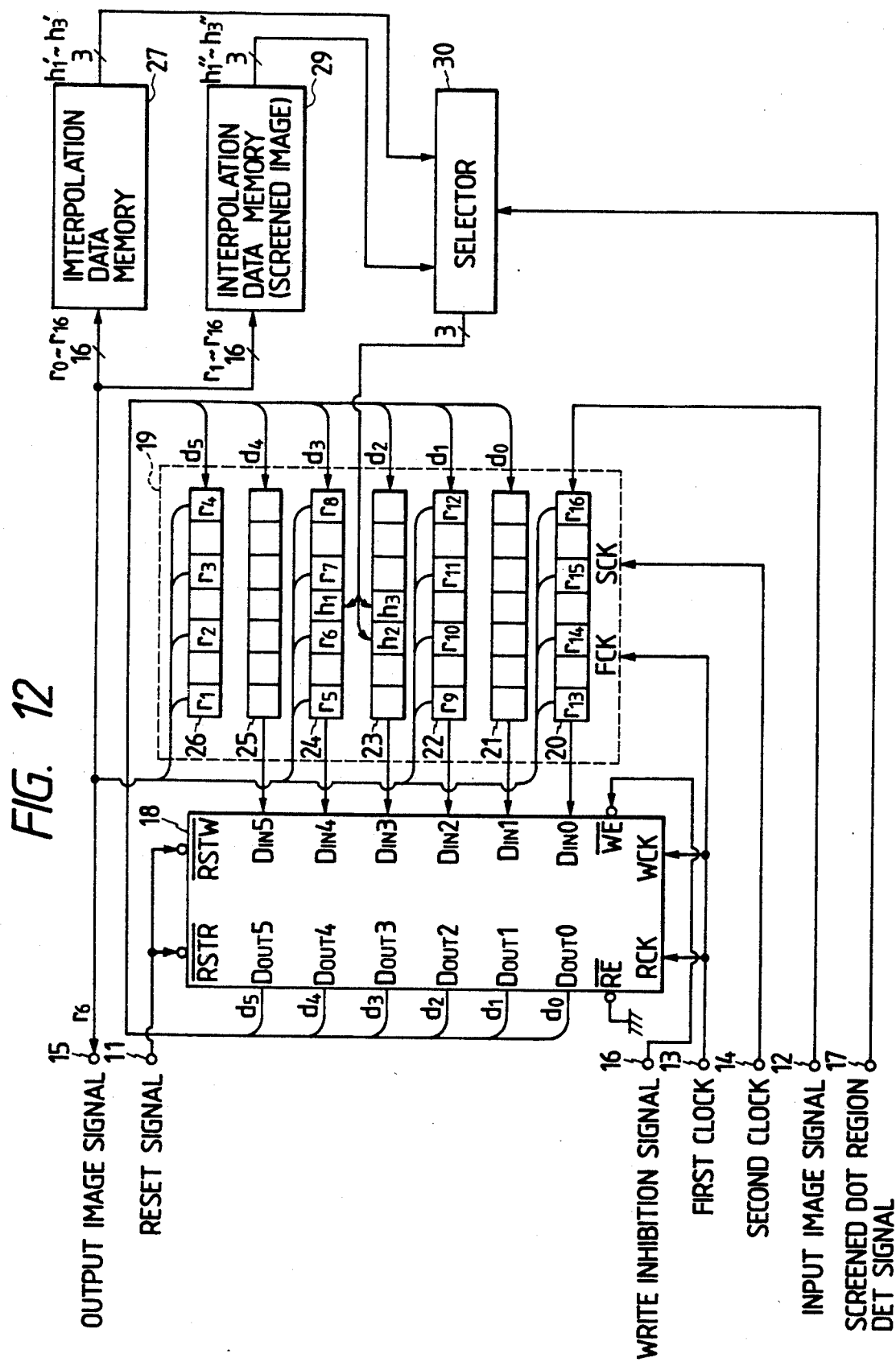
FIG. 12 is a block diagram of a circuit for executing the interpolation process in the method of FIG. 11.

FIG. 12 shows a circuit for executing the interpolation process 10. The interpolation circuit of FIG. 12 is similar to the interpolation circuit of FIG. 4 except for design changes indicated hereinafter. The interpolation circuit of FIG. 12 includes a memory 29 which is previously loaded with screened dot image interpolation data h"1–h"3 which are generated by the interpolation data making process 9. The 1-bit storage segments r1–r16 of a register group 19 are connected to address lines of the screened dot image interpolation data memory 29 so that the data in the 1-bit storage segments r1–r16 form an address signal for the access to the storage locations of the screened dot image interpolation data memory 29. The screened dot image interpolation data h"1–h"3 outputted from the memory 29 are determined in dependence on the data in the 1-bit storage segments r1–r16 of the register group 19. A data selector 30 receives interpolation data h'1–h'3 outputted from a memory 27. In addition, the data selector 30 receives the screened dot image interpolation data h"1–h"3 outputted from the memory 29. The data selector 30 has three output terminals which are connected to 1-bit storage segments h1–h3 of the register group 19. The data selector 30 has a control terminal receiving a screen dot region detection signal via an input terminal 17. When the screen dot region detection signal is in an ON state (=1), that is, when the input image signal represents a screened dot image, the data selector 30 loads the 1-bit storage segments h1–h3 of the register group 19 with the screened dot image interpolation data h″1–h″3 respectively. When the screen dot region detection signal is in an OFF state (=0), that is, when the input image signal does not represent a screened dot image, the data selector 30 loads the 1-bit storage segments h1–h3 of the register group 19 with the interpolation data h′1–h′3 respectively.

DESCRIPTION OF THE THIRD PREFERRED EMBODIMENT

Figure 13:
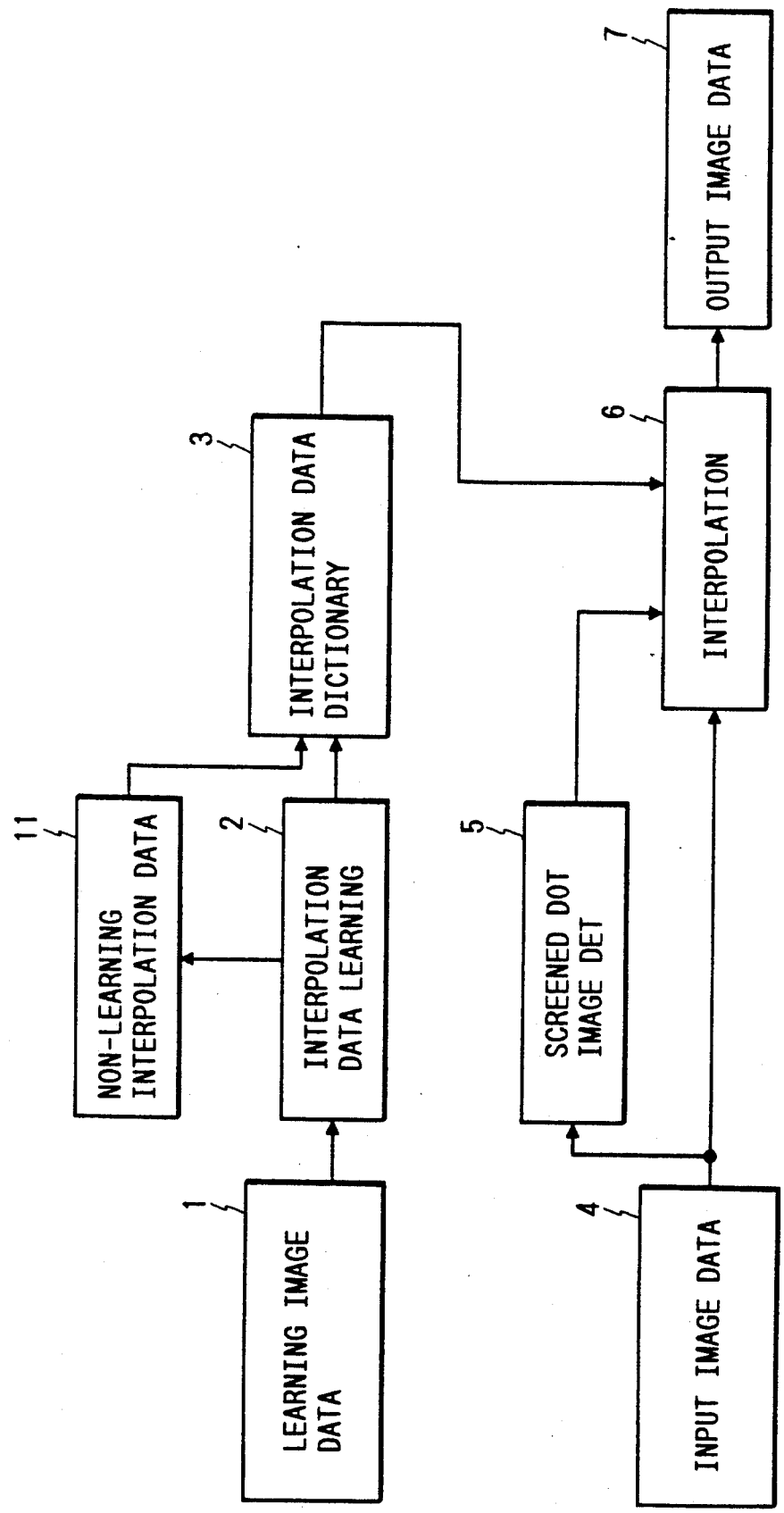
FIG. 13 is a diagram showing a flow of processes in a method of converting a line density of a bi-level image signal according to a third embodiment of this invention.

FIG. 13 shows a third embodiment of this invention which is similar to the embodiment of FIGS. 1–10 except for additional designs which will be explained hereinafter. In the embodiment of FIG. 13, a block 11 connected between blocks 2 and 3 denotes a process of making non-learning interpolation data. Some pattern structures of input image data 4 can not be learned by the interpolation data learning process 2. In the non-learning interpolation data making process 11, interpolation data values with respect to such pattern structures are generated on the basis of a given algorithm, and the generated interpolation data values are set in an interpolation data dictionary made by the block 3. Specifically, with respect to some reference pixel patterns, all counter values hi of the result of the interpolation data learning process 2 are "0". Such reference pixel patterns are regarded as non-learning patterns which are absent from the learning image data 1. Non-learning interpolation data for the non-learning patterns are made by the process 11.

Figure 14:
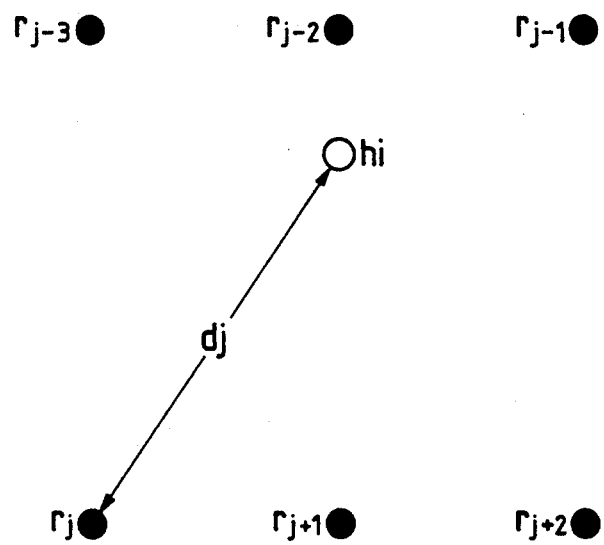
FIG. 14 is a diagram showing an interpolation pixel and peripheral reference pixels in the method of FIG. 13.

The generation of the non-learning interpolation data will be described hereinafter with reference to FIG. 14. The interpolation data value (the bi-level data is represented by h′i) for the pixel hi is calculated from the data values (1/0) of an "n" number of peripheral reference pixels r1, r2, ..., rn by referring to the following equation.

$$hi = \frac{1}{\sum_{j=1}^{n} dj^k} \sum_{j=1}^{n} \frac{rj}{dj^k}$$

where dj denotes the spatial distance between the interpolation pixel hi and the reference pixel rj, and "k" denotes a predetermined constant in the range between 1 and 2. When the calculated interpolation data value hi is equal to or greater than 0.5, the bi-level data value h′i is set to "1". When the calculated interpolation data value hi is smaller than 0.5, the bi-level data value h′i is set to "0".

Since the non-learning interpolation data making process 11 tends to occur for a screened dot image, a screened dot image detecting process 5 may be omitted.

DESCRIPTION OF THE FOURTH PREFERRED EMBODIMENT

Figure 15:
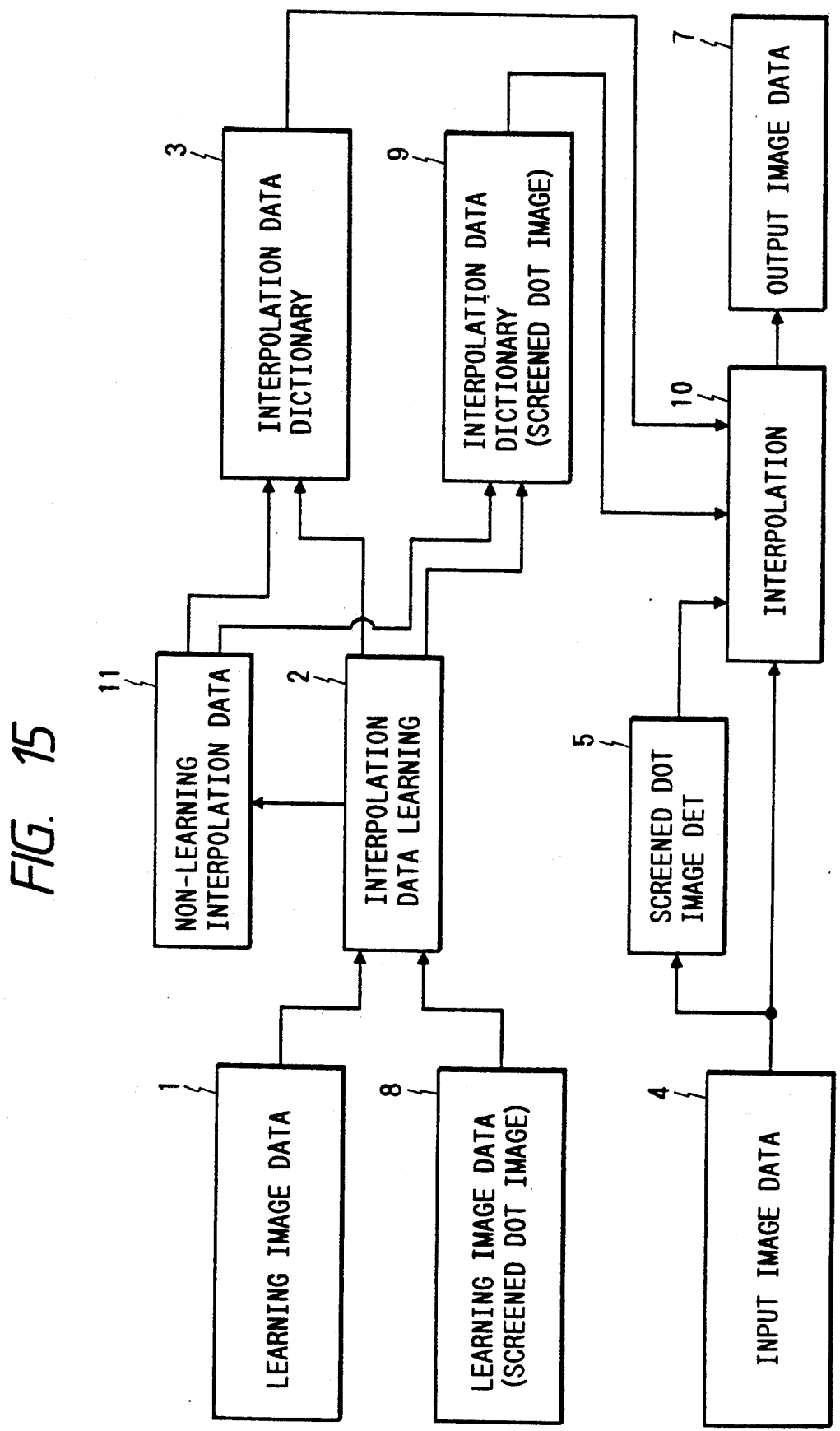
FIG. 15 is a diagram showing a flow of processes in a method of converting a line density of a bi-level image signal according to a fourth embodiment of this invention.

FIG. 15 shows a fourth embodiment of this invention which is similar to the embodiment of FIGS. 11 and 12 except for additional designs which will be explained hereinafter. In the embodiment of FIG. 15, a process 11 is executed among processes 2, 3, and 9. This process 11 is similar to the process 11 of FIG. 13.

What is claimed is:

1. A method of converting a low-density bi-level image into a high-density bi-level image through a pixel interpolation process, comprising the steps of:
    determining a correspondence relation between a structure of a first bi-level pattern and a structure of a second bi-level pattern by use of a reference high-density image, the first bi-level pattern forming a partial region of a low-density character and line image except a screened dot image, the second bi-level pattern forming a corresponding partial region of a desired high-density image;
    making an interpolation dictionary representing the correspondence relation between bi-level patterns determined by the determining step;
    judging whether the low-density image is equal to or different from a screened dot image;
    selecting reference pixels from the partial region of the low-density image;
    converting the low-density first bi-level pattern into the high-density second bi-level pattern according to the correspondence relation in the interpolation dictionary by use of the selected reference pixels when the low-density image is judged to be different from a screened dot image; and
    repeating a pixel of the low-density image to convert the low-density image into the high-density image when the low-density image is equal to a screened dot image.

2. The method of claim 1 wherein said judging step is performed on the basis of a result of a learning process using a low-density image.

3. The method of claim 2 wherein judgment results of the judging step are smoothed into final judgment results.

4. The method of claim 1 wherein said judging step comprises judging a pattern structure of a scanning window for scanning the low-density image.

5. The method of claim 4 wherein said pattern-judging step is performed on the basis of a number of pairs of "1" and "0" in adjacent pixels in the scanning window.

6. The method of claim 4 wherein said pattern-judging step is performed on the basis of a number of isolated points of "1" and "0" in the scanning window.

7. The method of claim 4 wherein judgment results of the judging step are smoothed into final judgment results.

8. A method of converting a low-density bi-level image into a high-density bi-level image through a pixel interpolation process, comprising the steps of:
    determining a first correspondence relation between a structure of a first bi-level pattern and a structure of a second bi-level pattern by use of a reference high-density image, the first bi-level pattern forming a partial region of a low-density character and line image except a screened dot image, the second bi-level pattern forming a corresponding partial region of a desired high-density image;
    determining a second correspondence relation between a structure of a third bi-level pattern and a structure of a fourth bi-level pattern by use of a reference high-density image, the third bi-level pattern forming a partial region of a low-density screened dot image, the fourth bi-level pattern forming a corresponding partial region of a desired high-density image;
    making a first interpolation dictionary representing the first correspondence relation between bi-level patterns;
    making a second interpolation dictionary representing the second correspondence relation between bi-level patterns;

judging whether the low-density image is equal to or different from a screened dot image;

selecting reference pixels from the partial region of the low-density image;

converting the low-denisty first bi-level pattern into the high-density second bi-level pattern according to the first correspondence relation in the first interpolation dictionary by use of the selected reference pixels when the low-density image is different from a screened dot image; and converting the low-density third bi-level pattern into the high-density fourth bi-level pattern according to the second correspondence relation in the second interpolation dictionary by use of the selected reference pixels when the low-density image is equal to a screened dot image.

9. The method of claim 8 wherein said judging step is performed on the basis of a result of a determining process using a low-density reference image.

10. The method of claim 9 wherein judgement results of the judging step are smoothed into final judgment results.

11. The method of claim 8 wherein said judging step comprises judging a pattern structure of a scanning window for scanning the low-density image.

12. The method of claim 11 wherein said pattern-judging step is performed on the basis of a number of pairs of "1" and "0" in adjacent pixels in the scanning window.

13. The method of claim 11 wherein said pattern-judging step is performed on the basis of a number of isolated points of "1" and "0" in the scanning window.

14. The method of claim 11 wherein judgement results of the judging step are smoothed into final judgment results.

15. A method of converting a low-density bi-level image into a high-density bi-level image through a pixel interpolation process, comprising the steps of:

determining a correspondence relation between a structure of a first bi-level pattern and a structure of a second bi-level pattern by use of a reference high-density image, the first bi-level pattern forming a partial region of a low-density character and line image except a screened dot image, the second bi-level pattern forming a corresponding partial region of a desired high-density image;

making a first portion of an interpolation dictionary which represents said correspondence relation between structures of bi-level patterns;

making a correspondence relation represented by a second portion of the interpolation dictionary from given pixels of the first bi-level pattern in accordance with a given rule, wherein the correspondence relation in the second portion of the interpolation dictionary can not be determining by said determining step;

selecting reference pixels from the partial region of the low-density image; and converting the low-density first bi-level pattern into the high-density second bi-level pattern on the basis of the interpolation dictionary by use of the selected reference pixels.

16. The method of claim 15 wherein said rule includes a function of data values of reference pixels selected from the first bi-level pattern in correspondence with an interpolation pixel, and a spatial distance between the interpolation pixel and the reference pixels.

17. A method of claim 15 wherein said step of determining comprises performing a statistical analysis of high-density pixel patterns in at least one reference image.

* * * * *